(12) United States Patent
Kang

(10) Patent No.: US 7,478,464 B2
(45) Date of Patent: Jan. 20, 2009

(54) TOOL SET FOR ASSEMBLING AN AUTOMOBILE TAPERED BEARING

(76) Inventor: Hsin Fa Kang, P.O. Box 90, Tainan City 70499 (TW)

( * ) Notice: Subject to any disclaimer, the term of this patent is extended or adjusted under 35 U.S.C. 154(b) by 45 days.

(21) Appl. No.: 11/751,639

(22) Filed: May 22, 2007

(65) Prior Publication Data
US 2008/0289841 A1 Nov. 27, 2008

(51) Int. Cl.
*B23P 19/04* (2006.01)
(52) U.S. Cl. .............................. 29/255; 29/263; 29/280
(58) Field of Classification Search .................. 29/255, 29/244, 263, 280, 270, 283
See application file for complete search history.

(56) References Cited

U.S. PATENT DOCUMENTS

| | | | | |
|---|---|---|---|---|
| 3,208,134 A | * | 9/1965 | Krewson, Jr. ............ | 29/898.01 |
| 5,355,572 A | * | 10/1994 | Kammeraad et al. ........ | 29/213.1 |
| 6,148,493 A | * | 11/2000 | Pixley et al. .................. | 29/275 |
| 6,415,490 B1 | * | 7/2002 | Caruso et al. ................. | 29/256 |
| 6,839,947 B1 | * | 1/2005 | Dudeck ....................... | 29/255 |
| 2008/0060183 A1 | * | 3/2008 | Walker ........................ | 29/255 |

* cited by examiner

*Primary Examiner*—Lee D Wilson

(57) ABSTRACT

A tool set for assembling an automobile tapered bearing includes a pneumatic tool, a hammering tool, bolts and plural press blocks. The pneumatic tool consists of a rod having an annular blocking surface, a sleeve fitting around the rod, a compression spring received in the sleeve and fitting round a fitting portion of the rod, and a connector threadably combined with the rod. The hammering tool consists of a grip and a connecting rod extending from the grip and provided with a female-threaded hole, and the grip has a hammering end. Each press block is formed with an annular sloped surface and an annular blocking surface. One of the press blocks is selected to combine with the rod, so a pneumatic apparatus can drive the pneumatic tool to press and shift an automobile tapered bearing in an axle insert hole smoothly.

5 Claims, 9 Drawing Sheets

TOOL SET FOR ASSEMBLING AN AUTOMOBILE TAPERED BEARING

BACKGROUND OF THE INVENTION

1. Field of the Invention

This invention relates to a tool set for assembling an automobile tapered bearing, particularly to one consisting of a pneumatic tool, a hammering tool, bolts and plural different-sized position-press blocks, able to steadily and quickly assemble and position the tapered bearing of an automobile in place.

2. Description of the Prior Art

As commonly known, a bearing is an essential part for positioning an axle and for lessening wear of the axle, so the bearing is one of the machine parts that are indispensable in transmission. A conventional way of assembling a bearing, as shown in FIG. 1, is to place the bearing (B) in an axle insert hole (A) and then slightly hammer the topside of the bearing (B) with a tool (C), or strike the corners of the bearing (B) with a hollow rod or a copper rod, which has a diameter somewhat smaller than the outer diameter of the bearing (B), for driving the bearing (B) into the axle insert hole (A). During carrying out hammering of the bearing (B), an operator must pay attention to whether the bearing (B) is kept balanced or not.

However, the conventional method of assembling the bearing (B) by hammering is likely to cause imbalanced force applied and as a consequence fails to keep the bearing (B) balanced; therefore, the inner wall of the axle insert hole (A) may be damaged and worn off, thus rendering the bearing (B) unable to be fitted closely with the axle insert hole (A), liable to produce noises during rotation of the axle and also easy to result in faults of machine parts.

SUMMARY OF THE INVENTION

The objective of this invention is to offer a tool set for assembling an automobile tapered bearing, able to steadily and quickly assemble and position the automobile tapered bearing in place.

The tool set for assembling an automobile tapered bearing in the present invention includes a pneumatic tool, a hammering tool, plural bolts and plural press blocks. The pneumatic tool is composed of a rod, a sleeve, a compression spring and a combining head. The rod has one end portion formed with a fitting member and an annular blocking surface formed in its intermediate section, and an insert portion formed to extend downward from the annular blocking surface and having its lower end formed with a combining hole. The sleeve to be fitted around the rod is disposed in the interior with a passageway having an annular blocking surface formed on the inner wall near the lower end. The compression spring is fitted around the insert portion of the rod and received in the passageway of the sleeve, having one end pushing against the annular blocking surface and the other end pushing against the annular blocking surface of the sleeve. The combining head threadably combined with the lower end of the rod is provided with a male-threaded rod and an annular blocking surface and has its lower end bored with a female-threaded hole. The hammering tool is provided with a grip having one end connected with a connecting rod, which has its lower end bored with a female-threaded hole. The grip further has its topside provided with a hammering end. The press blocks are different from one another in diameter to be fitted with the combining head and fixed in position by the bolt. Each press block is bored with an insert hole in the center and formed with at least one annular sloped surface and at least one annular blocking surface.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
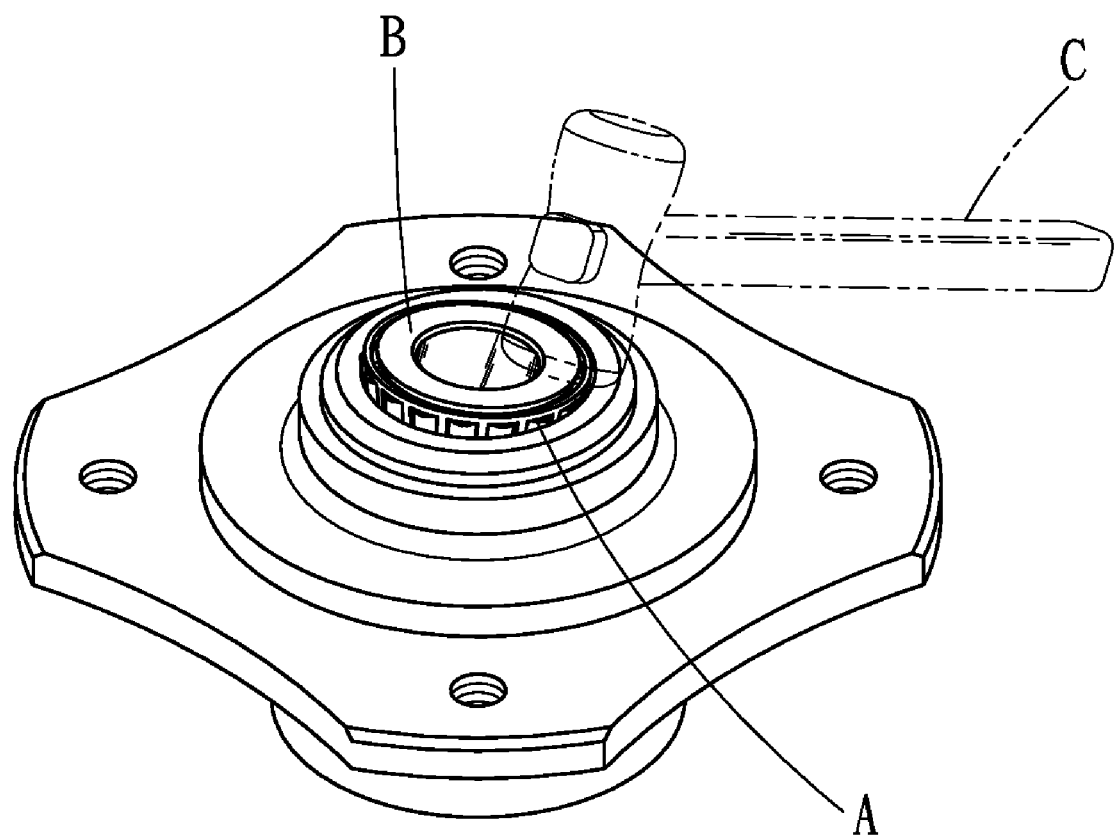
FIG. 1 is a perspective view of a conventional tool for assembling a bearing, showing it under operation.
Figure 2:
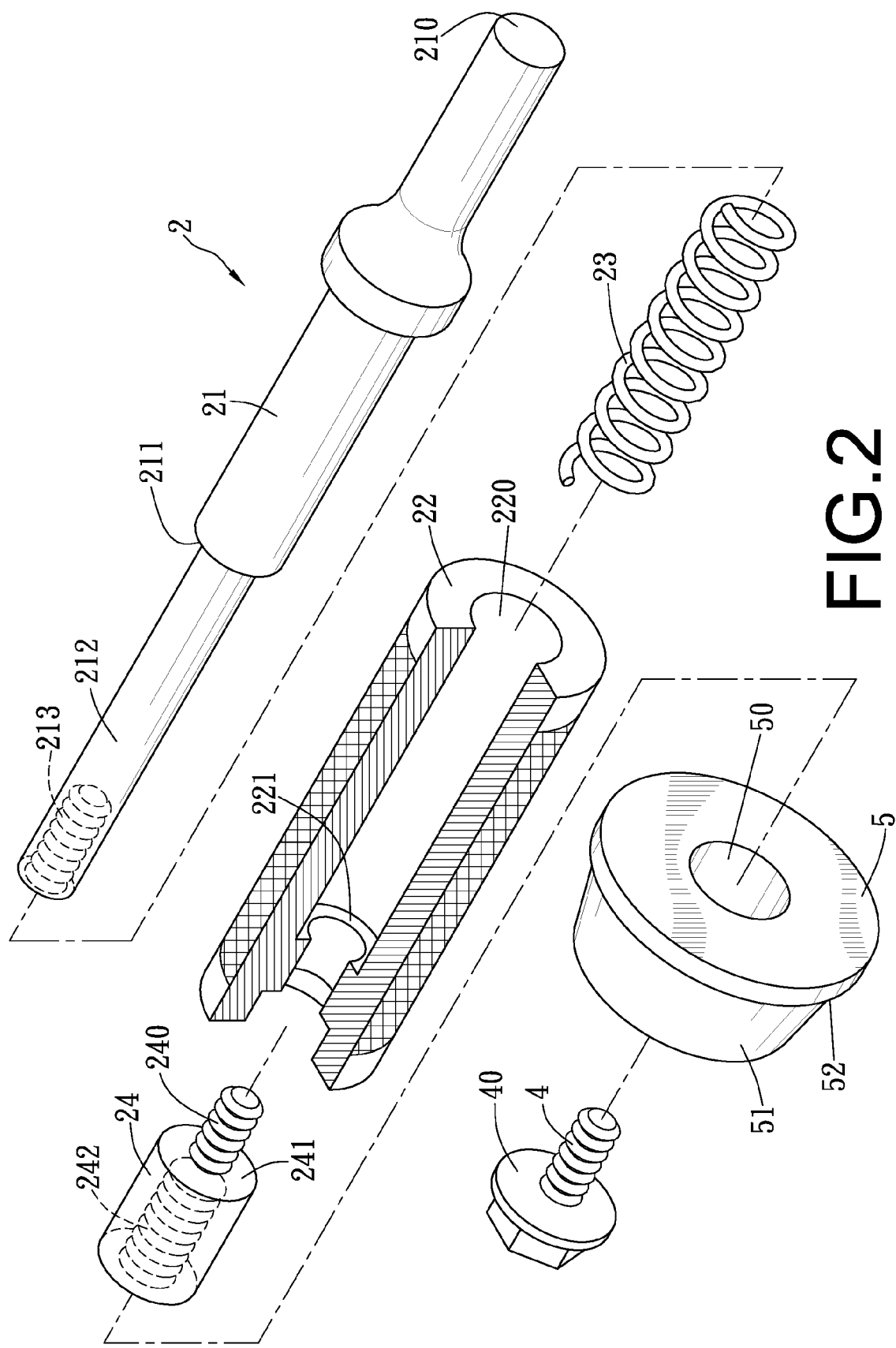
FIG. 2 is an exploded perspective view of a pneumatic tool in the present invention.
Figure 3:
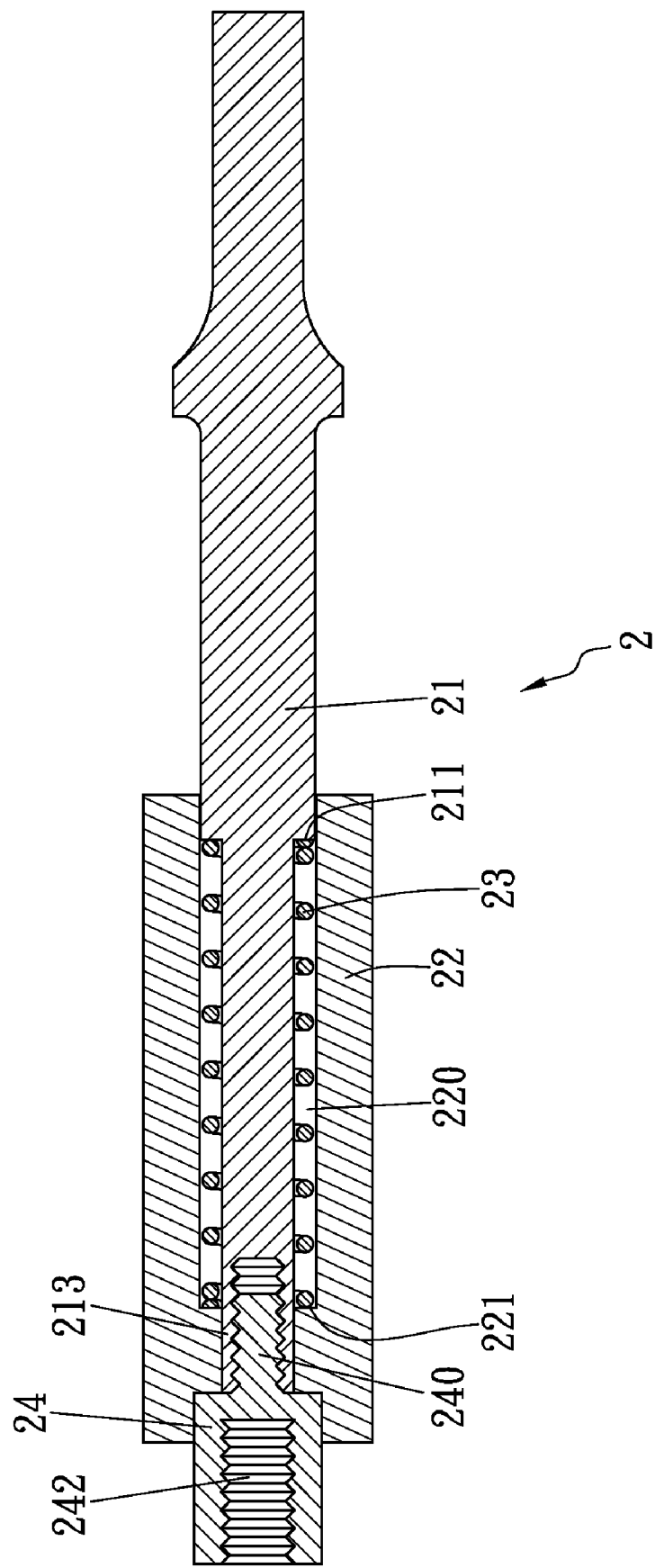
FIG. 3 is a cross-sectional view of the pneumatic tool in the present invention.
Figure 4:
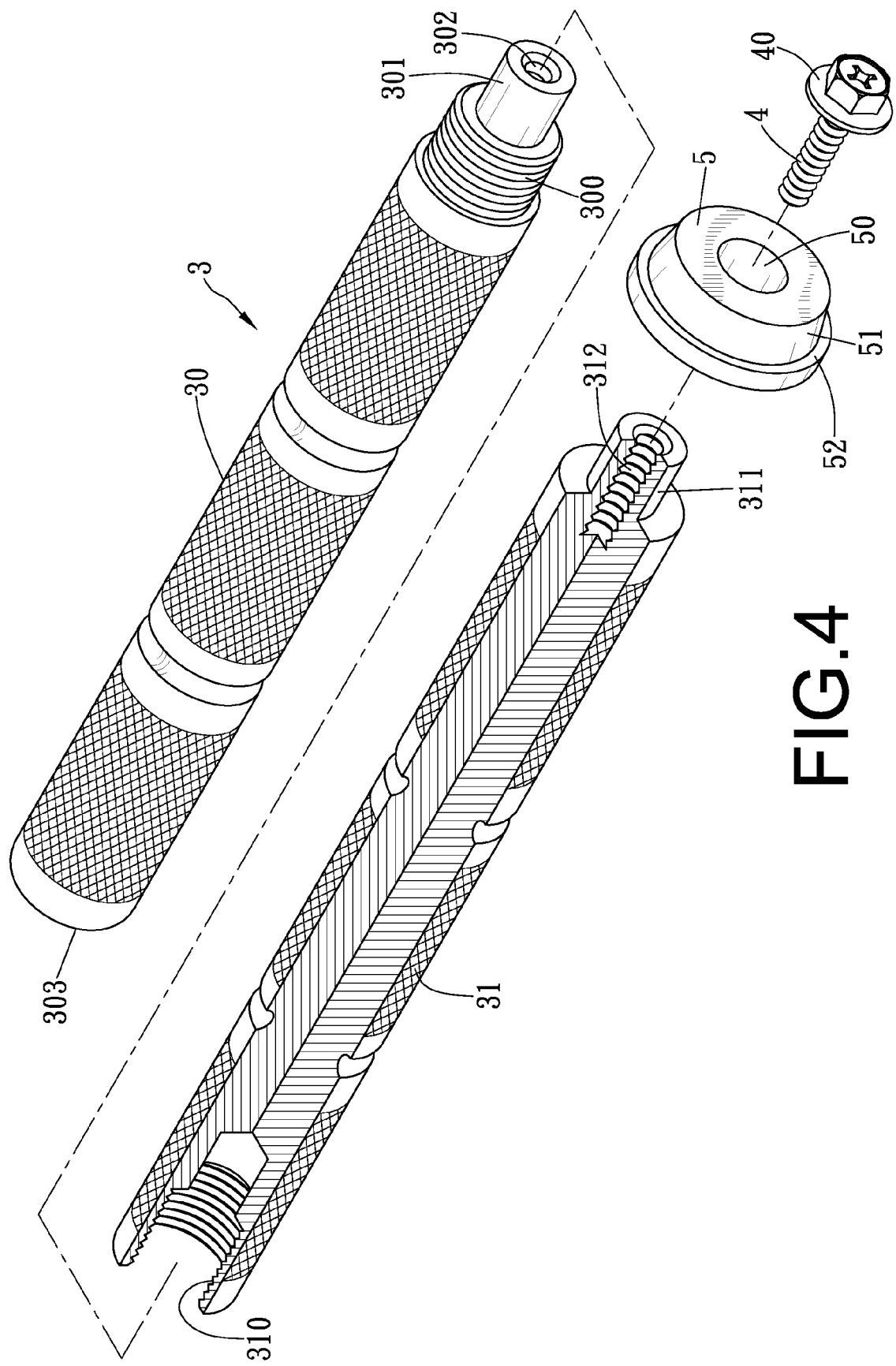
FIG. 4 is an exploded perspective view of a hammering tool in the present invention.
Figure 5:
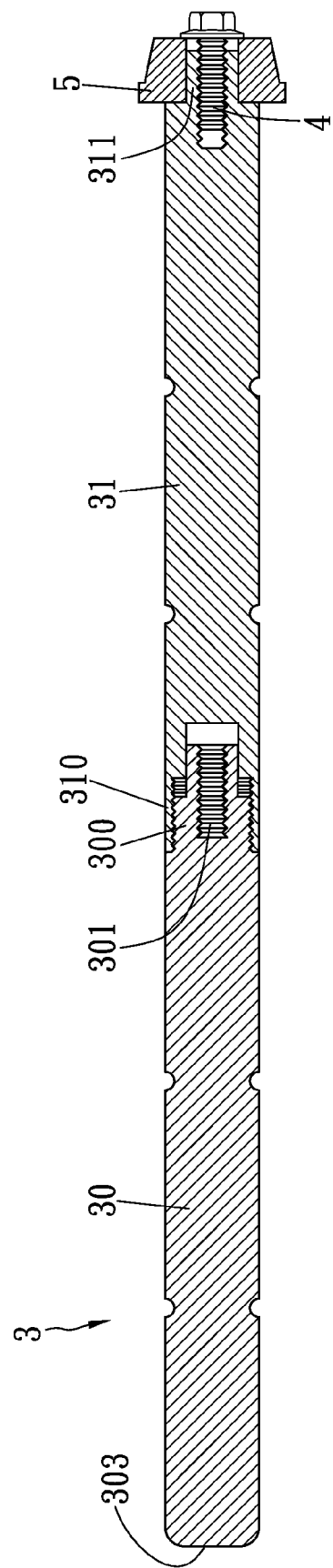
FIG. 5 is a cross-sectional view of the hammering tool in the present invention.
Figure 6:
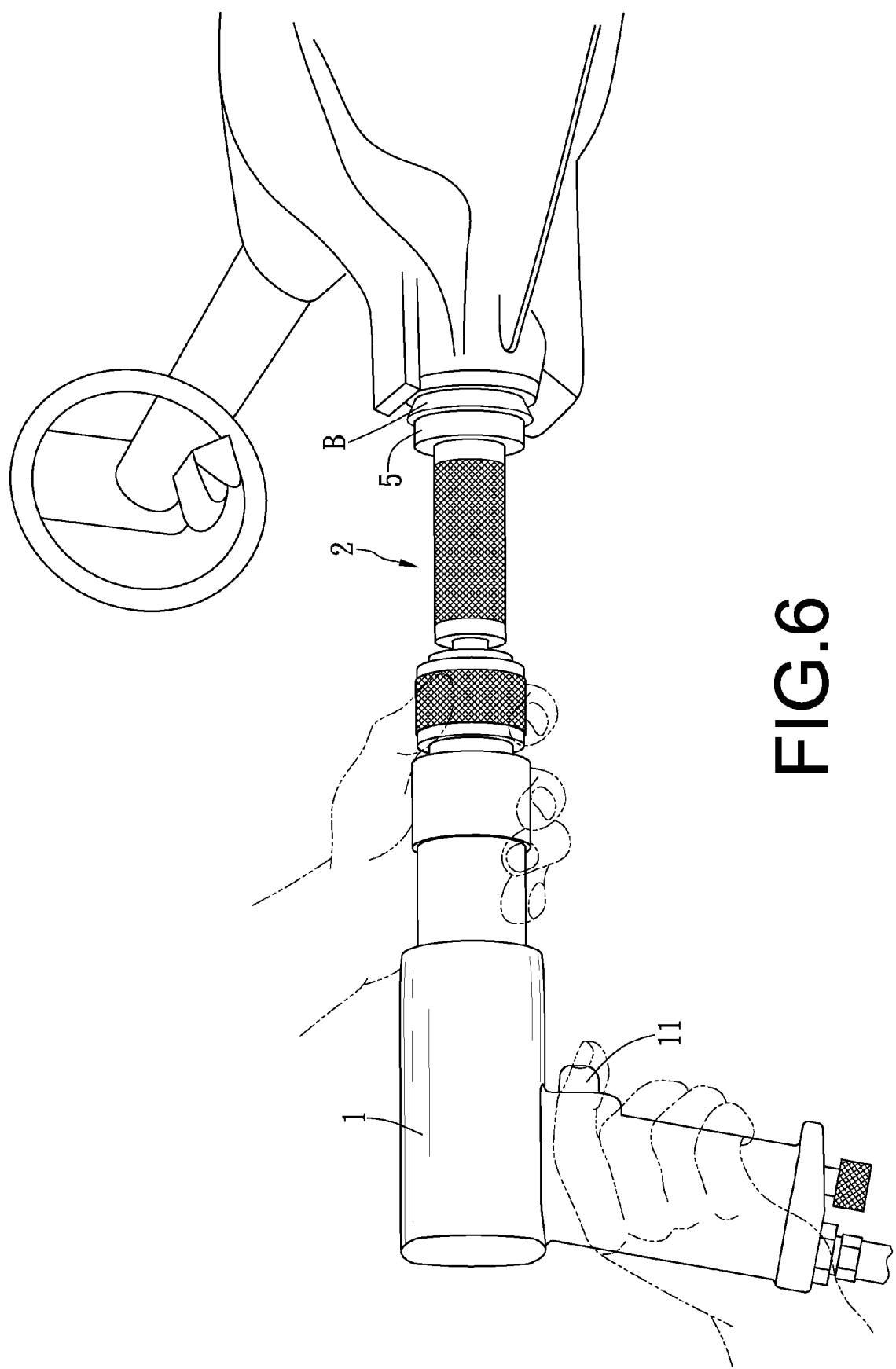
FIG. 6 is a perspective view of the pneumatic tool in an operating condition in the present invention.
Figure 7:
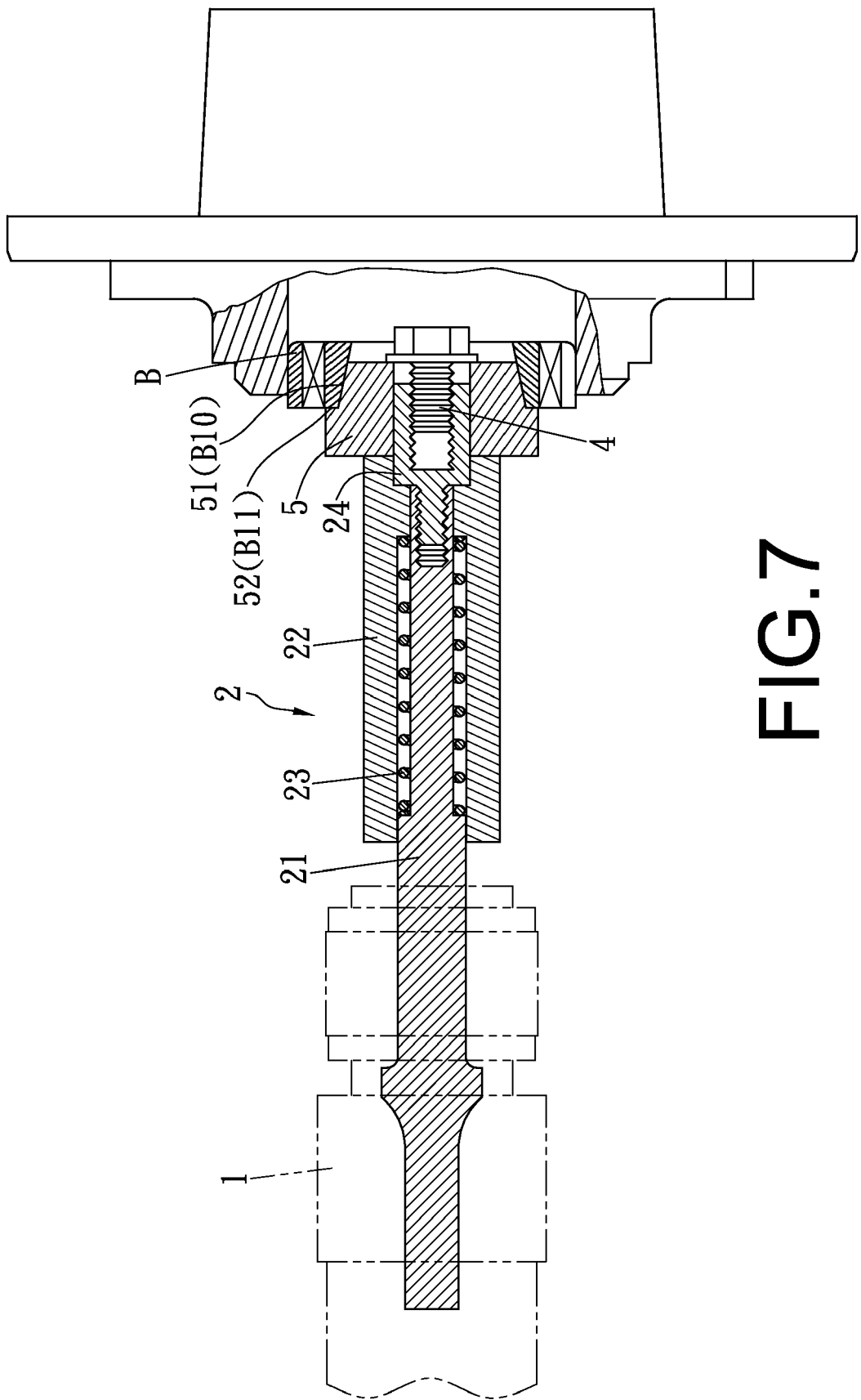
FIG. 7 is a cross-sectional view of the pneumatic tool in an operating condition in the present invention.
Figure 8:
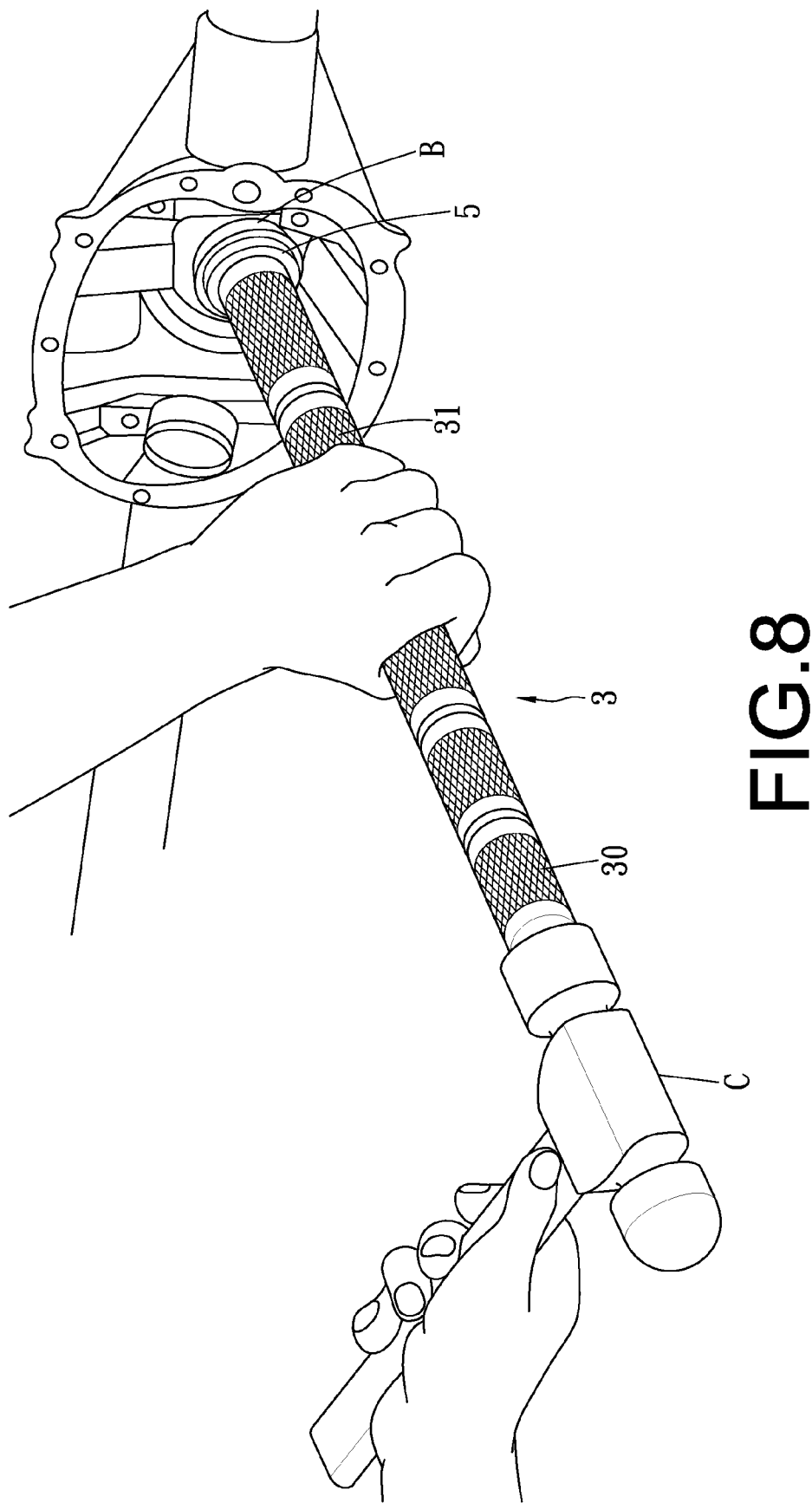
FIG. 8 is a perspective view of the hammering tool in an operating condition in the present invention.

A preferred embodiment of a tool set for assembling an automobile tapered bearing in the present invention, as shown in FIGS. 2 to 6, includes a pneumatic tool 2 to be combined with a pneumatic apparatus 1, a hammering tool 3, bolts 4 and a plurality of press blocks 5.

The pneumatic tool 2 is composed of a rod 21, a sleeve 22, a compression spring 23 and a connector 24. The rod 21 has one end portion formed with a fitting portion 210 and an annular blocking surface 211 formed in its intermediate portion, and an insert portion 212 formed to extend downward from the annular blocking surface 211 and having a comparatively small outer diameter than that of the fitting portion 210 and its lower end formed with a female-threaded combining hole 213. The sleeve 22 to be fitted around the rod 21 is formed with an interior hollow passageway 220 having an annular blocking surface 221 formed on the inner wall near the lower end. The compression spring 23 is fitted around the insert portion 212 of the rod 21 and received in the passageway 220 of the sleeve 22, having one end pushing against the annular blocking surface 211 of the rod 21 and the other end pushing against the annular blocking surface 221 of the sleeve 22. The connector 24 to be threadably combined with the lower end of the rod 21 is provided with a male-threaded rod 240 having its lower end disposed with an annular blocking surface 241 to urge the annular blocking surface 221 of the sleeve 22. The connector 24 further has its lower end bored with a female-threaded hole 242 for a bolt 4 to be screwed therein. The bolt 4 has a washer 40 located on a lower side of its head.

The hammering tool 3 is composed of a grip 30 and a connecting rod 31. The grip 30 has one end extending outward to form a combining stud 300 having a connecting head 301 extending forward from its front end, and bored with a female-threaded hole 302. Further, the grip 30 has its upper end formed with a hammering end 303. The connecting rod 31 to be connected with the grip 30 has one end provided with a combining hole 310 to be threadably combined with the combining stud 300 of the grip 30 and the other end formed with a combining head 311 and bored with a female-threaded hole 312 for a bolt 4 to be screwed therein. The bolt 4 is provided with a washer 40.

The plural press blocks 5 made of plastic or metal are different from one another in diameter. Each press block 5 is bored with a center insert hole 50, and a proper press block is selected to be fitted around the combining head 301 of the grip 30 or with the combining head 311 of the connecting rod 31 and fixed in position by means of the bolt 4. Further, each press block 5 is provided with at least one annular sloped surface 51 and at least one annular blocking surface 52.

A tool box 6 is provided for depositing foresaid members and tools therein.

When the pneumatic tool 2 is to be used, firstly, the rod 21 has its fitting portion 210 combined with a pneumatic apparatus 1. Next, pick out a proper press block 5 whose outer diameter matches with the inner diameter of the bearing (B) to be assembled, and then have the center insert hole 50 of the press block 5 fitted with the connector 24 and fix the press block 5 in position by the bolt 4 screwed with the threaded hole 242 of the connector 24. Afterward, hold the pneumatic apparatus 1 and have the annular sloped surface 51 of the press block 5 closely positioned in the inner diametrical wall (B10) of the bearing (B), letting the annular blocking surface 52 of the press block 5 pressed on the upper edge (B11) of the bearing (B). Then, press the starting button 11 of the pneumatic apparatus 1 with the index finger to let the pneumatic apparatus 1 drive the rod 21 and the press block 5 with air pressure and push them forward to press the bearing (B). Thus, the bearing (B) can be smoothly and quickly shifted and positioned in the axle insert hole (A) by the annular sloped surface 51 and the annular blocking surface 52 of the press block 5 respectively and closely contacting with the inner diametrical wall (B10) and the upper annular surface (B11) of the bearing (B). When the rod 21 and the press block 5 are driven to push and press the bearing (B), the compression spring 23 inside the sleeve 22, after compressed, will recoil and produce reverse thrust toward the rod 21 to retard the impact force so that the air pressure of the compressed air apparatus 1 directly pushes the rod 21 and the press block 5 together, thus enabling the bearing (B) to be assembled with great smoothness and steadiness.

When the hammering tool 3 is to be used, firstly, the grip 30 and the connecting rod 31 are threadably combined together, or only the grip 30 is prepared to be used alone. Next, a press block 5 with a proper size is picked out and has its center insert hole 50 fitted around the combining head 311 of the connecting rod 31, or directly fitted on the connecting head 301 at the front end of the connecting stud 300 of the grip 30 and then the bolt 4 is screwed with the female-threaded hole 312 of the combining head 311 or screwed with the female-threaded hole 302 of the grip 30 for fixing the press block 5 in position. At this time, an operator can hold the grip 30 with one hand to have the annular sloped surface 51 of the press block 5 closely contacting with the inner diametrical wall (B10) of the bearing (B), letting the annular blocking surface 52 of the press block 5 pressed on the upper annular surface (B11) of the bearing (B), and then hold a striking tool (C) with the other hand to strike the hammering end 303 of the grip 30. Thus, by the annular sloped surface 51 and the annular blocking surface 52 of the press block 5 respectively and closely contacting with the inner diametrical wall (B10) and the upper annular surface (B11) of the bearing (B), the bearing (B) can be steadily and quickly assembled and positioned in the axle insert hole (A).

Figure 9:
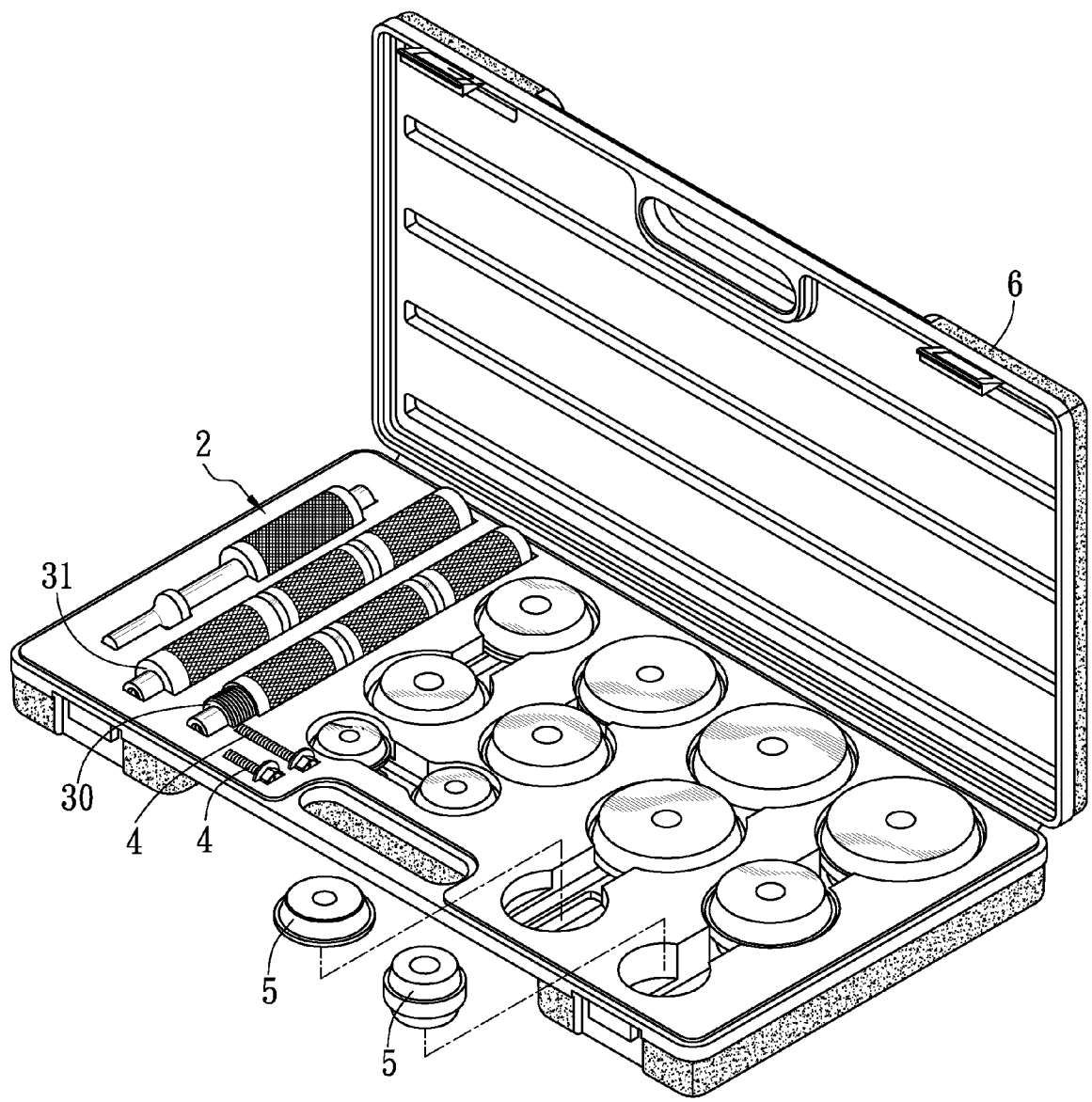
FIG. 9 is a perspective view of all the members deposited in a toolbox in the present invention.

The press blocks 5 of this invention are made of plastic or metal and can be formed into one single diameter or two different diameters for matching with different-sized bearings. In addition, when foresaid tools are not used, they can be deposited in the tool box 6, as shown in FIG. 9.

While the preferred embodiment of the invention has been described above, it will be recognized and understood that various modifications may be made therein and the appended claims are intended to cover all such modifications that may fall within the spirit and scope of the invention.

What is claimed is:

1. A tool set for assembling an automobile tapered bearing comprising a pneumatic tool, a hammering tool, bolts and plural press blocks;

said pneumatic tool composed of a rod, a sleeve, a compression spring and a combining head, said rod having one end portion formed with a fitting portion, said rod formed with an annular blocking surface in an intermediate section, an insert portion formed to extend downward from said annular blocking surface and a lower end of the insert portion being disposed with a combining hole, said sleeve fitted around said rod and formed with a passageway in the interior, said passageway of said sleeve disposed therein with an annular blocking surface on an inner wall thereof near said lower end, said compressing spring fitted around said insert portion of said rod and received in said passageway of said sleeve, said compression spring having one end pushing against said annular blocking surface of said rod and another end pushing against said annular blocking surface of said sleeve, said connector threadably combined with said lower end of said rod, said connector provided with a male-threaded rod and an annular blocking surface, said connector having lower end bored with a female-threaded hole;

said hammering tool provided with a grip, said grip having one end formed with a combining stud bored with a female-threaded hole, said grip having a topside disposed with a hammering end; and said press blocks respectively formed with different diameters, one of said press blocks selectably fitted with said connector of said pneumatic tool and fixed in position by said bolt, each said press block bored with an insert hole in a center of the press block and disposed with at least one annular sloped surface and at least one annular blocking surface.

2. The tool set for assembling an automobile tapered bearing as claimed in claim 1, Wherein said hammering tool is provided with a connecting rod to be connected with said grip, said connecting rod having one end provided with a combining hole, said connecting rod having said another end extending outward to form a combining head with a female-threaded hole.

3. The tool set for assembling an automobile tapered bearing claimed in claim 1, wherein said press blocks are made of metal.

4. The tool set for assembling an automobile tapered bearing claimed in claim 1, wherein said press blocks are made of plastic.

5. The tool set for assembling an automobile tapered bearing as claimed in claim 1, wherein a toolbox is provided for depositing foresaid tools and members.

* * * * *